United States Patent [19]

Vinton

[11] 3,963,085

[45] June 15, 1976

[54] PLANETARY FOUR WHEEL DRIVE SYSTEM HAVING PLURAL MODES OF OPERATION

[75] Inventor: David S. Vinton, Morton, Ill.

[73] Assignee: Caterpillar Tractor Co., Peoria, Ill.

[22] Filed: Oct. 17, 1974

[21] Appl. No.: 515,482

[52] U.S. Cl. .......................... 180/44 R; 180/24.09; 180/49; 74/710.5
[51] Int. Cl.² ........................................ B60K 17/30
[58] Field of Search ............... 180/24.09, 44 R, 49; 192/4 C; 74/710.5, 711, 714, 781 R

[56] References Cited
UNITED STATES PATENTS

| | | | |
|---|---|---|---|
| 2,228,581 | 1/1941 | Olen | 180/44 R |
| 2,574,986 | 11/1951 | Schou | 180/44 R |
| 2,853,890 | 9/1958 | Kelbel | 180/49 X |
| 2,936,036 | 5/1960 | Norelius | 180/49 |
| 3,095,758 | 7/1963 | Bixby | 180/44 R X |
| 3,126,765 | 3/1964 | Conkle | 74/781 R |
| 3,378,093 | 4/1968 | Hill | 74/710.5 X |
| 3,656,573 | 4/1972 | Halberg | 180/44 R |
| 3,788,166 | 1/1974 | Hart | 74/710.5 |
| 3,828,877 | 8/1974 | Fogelberg | 180/44 R |
| 3,831,695 | 8/1974 | Osterloff | 180/44 R |

Primary Examiner—M. H. Wood, Jr.
Assistant Examiner—Terrance L. Siemens
Attorney, Agent, or Firm—Phillips, Moore, Weissenberger Lempio & Strabala

[57] ABSTRACT

A drive train for coupling the engine to the wheels of a vehicle has a compact combination of planetary gearing, transfer gearing and fluid pressure controlled clutches and brakes which may be conditioned to realize any of a plurality of operational modes to accommodate to different driving conditions. The available operational modes include ordinary two wheel drive, two wheel overdrive, a conventional four wheel drive action wherein power tends to be equally divided between front and rear axles, and an alternate four wheel drive mode wherein a predetermined division of torque is established between the front and rear axles together with a differential action therebetween. In a preferred form, the drive system may also be conditioned for parking by locking front and rear axles against rotation.

10 Claims, 1 Drawing Figure

U.S. Patent June 15, 1976 3,963,085
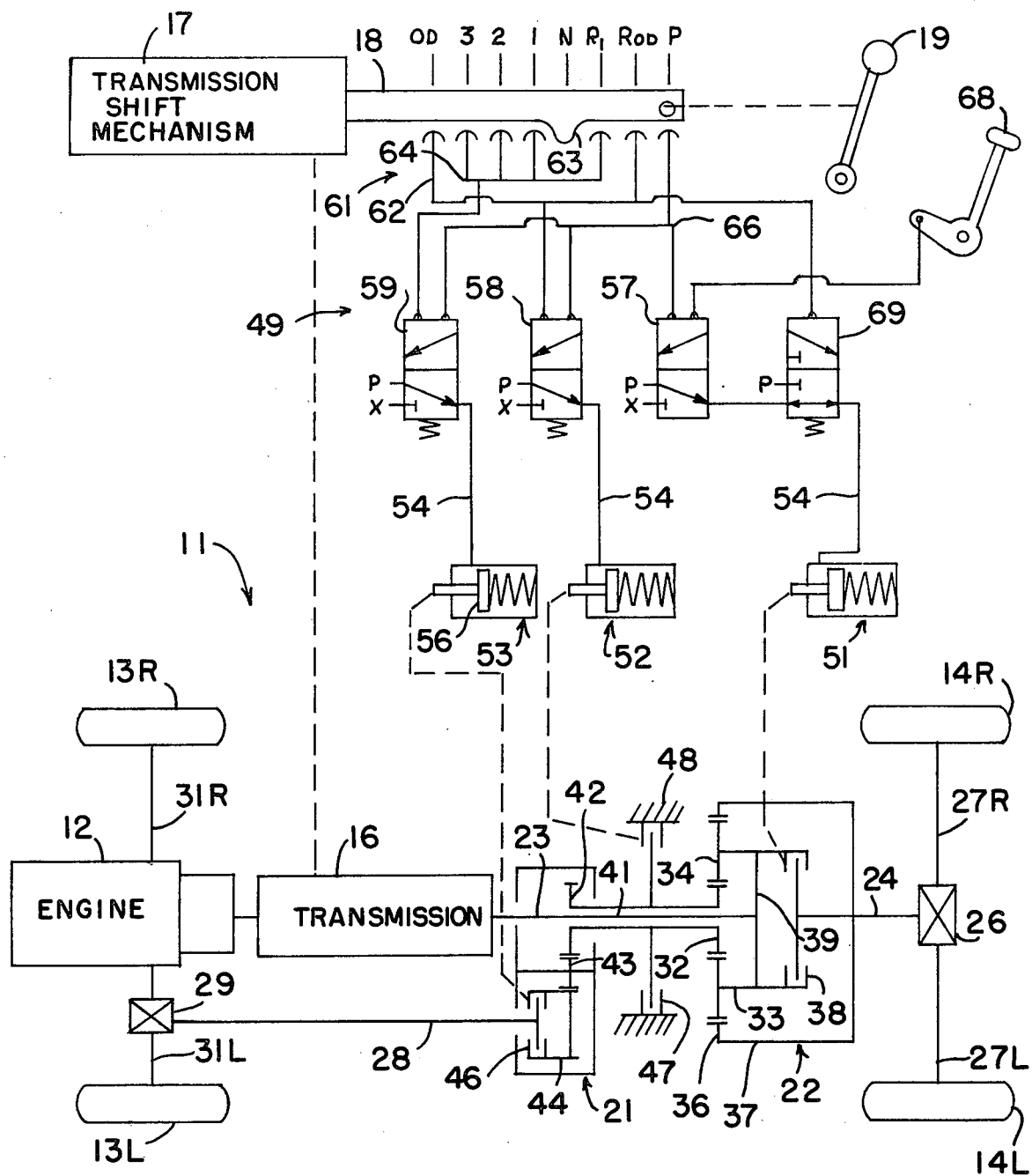

PLANETARY FOUR WHEEL DRIVE SYSTEM HAVING PLURAL MODES OF OPERATION

BACKGROUND OF THE INVENTION

This invention relates to mechanism for transmitting rotary drive between the engine and drive wheels of a vehicle and more particularly to drive mechanisms which provide for a selection of either a two wheel or a four wheel drive.

Many vehicles, including tractors, earth moving equipment, passenger vehicles and trucks, for example, have four wheel drive mechanism for use where high traction may be needed to move heavy loads or where the vehicle is operated under conditions where traction may be lost at one or more of the drive wheels because of characteristics of the surface over which the vehicle travels. To avoid unnecessary wear of four wheel drive components of the system and to minimize power losses, such vehicles are also usually capable of being operated in a two wheel drive mode when driving conditions permit this. In some vehicles, the drive transmitting mechanism also provides for a compound low drive ratio between the engine and wheels which is additional to the speed ranges realizable by shifting the vehicle transmission. In most instances the four wheel drive mode of operation is used at low vehicle speeds and the two wheel drive mode is employed at high speeds. Typical prior four wheel drive systems as used on tractors and earthworking equipment are disclosed in U.S. Pat. Nos. 2,971,595 and 2,946,238.

While prior four wheel drive systems may provide for more than one mode of operation as discussed above, there are still additional operational modes which would be highly desirable in order to increase the versatility of the vehicle for different operating conditions and in order to further reduce wear of the drive system. As pointed out above, a simple four wheel drive system of known form tends to force an equal division of torque between the front and rear axles. As a practical matter, it may be possible to obtain greater overall traction for the vehicle by delivering more torque to one axle because of unequal weight loads on the axles or for other reasons. Also, as pointed out above, it is generally considered undesirable to use the four wheel drive mode at higher vehicle speeds. One reason for this is that if there are slight differences in the front and rear axle drive paths, such a difference in the diameters of front and rear tires due to differences in the degree of inflation or the loading thereon, then a simple four wheel drive system forces some tire slip at one or both axles causing increased tire wear and increased stress on various other drive elements. These effects become more pronounced as the speed of the vehicle increases. However, there are operating conditions under which it would be desirable to employ four wheel drive at higher speeds if these undesirable effects can be alleviated. To accomplish this using known techniques would result in a very complex and costly drive system.

SUMMARY OF THE INVENTION

This invention is a compact and economical drive transmitting mechanism for a vehicle providing for operation in a two wheel drive mode or, alternately, in either of two four wheel drive test modes. In one four wheel drive mode, torque tends to be equally divided although somewhat indeterminately between front and rear axles while in the other four wheel drive mode, torque is divided between front and rear axles according to a predetermined preferred ratio and a differential action is present between front and rear axles as well as between individual wheels at each axle. For convenience of description, these three modes of operation will be respectively termed: two wheel drive, four wheel drive lock-up and torque splitting four wheel drive.

In addition to providing for the three modes of operation discussed above, the structure is inherently capable of providing, if desired, still additional modes of operation. These include an overdrive wherein the rotational speed of a drive shaft is increased relative to that of the output of the vehicle transmission and a parking mode wherein one or both of the front and rear drive shafts are immobilized.

Accordingly, it is an object of this invention to provide a more versatile and efficient drive system for four wheel drive vehicles.

It is another object of this invention to provide a compact and economical means for transmitting power from the engine of a vehicle to the wheels thereof which enables a two wheel drive mode of operation or a four wheel drive lock-up mode of operation and, in addition, a four wheel drive torque splitting mode of operation.

It is still another object of the invention to provide a drive system for a four wheel drive vehicle which has the capability of establishing an overdrive condition and which may be utilized to lock drive shafts against rotation when the vehicle is to be parked.

The invention, together with further objects and advantages thereof, will be better understood by reference to the following description of a preferred embodiment and by reference to the accompanying drawing.

BRIEF DESCRIPTION OF THE DRAWING

The accompanying drawing is a schematic diagram of drive train elements of a four wheel drive vehicle and suitable control means for conditioning the drive system to establish any of a plurality of different modes of operation.

DESCRIPTION OF THE PREFERRED EMBODIMENT

Referring now to the drawing, a vehicle 11 to which the invention may be applied will typically have a driving engine 12, front wheels 13R and 13L and rear wheels 14R and 14L. Drive from engine 12 is delivered initially to a transmission 16 having shift mechanism 17 coupled thereto to enable selection of any of a plurality of speed ranges or drive ratios which generally include both forward or reverse speeds. The engine 12, transmission 16 and shift mechanism 17 may be of known construction and accordingly are shown only schematically in the drawing. Shift mechanism 17 will typically have a selector rod 18 which is translatable by means of an operator's shift lever 19 to establish a desired gear setting in the transmission. In the present example, the transmission 16 is of the form providing three forward speeds, a neutral setting and one reverse speed although it will be apparent that the invention is readily adaptable to transmissions which offer other combinations of speed options. In this example of the invention, the shift mechanism selector rod 18 is arranged to have an additional position located past the third forward speed, which is a forward overdrive position, and has another additional position located past the reverse setting which is a reverse overdrive position. Selector rod has still another position which is the parking setting, the purpose of these additional positions of rod 18 being hereinafter described in connection with the operation of the invention.

From transmission 16, drive is transmitted through a transfer case 21 to a planetary gear set 22 by a rotatable shaft 23, the transfer case and planetary gearings being hereinafter discussed in more detail. From planetary gear set 22, a rear drive shaft 24 transmits drive to the rear wheels 14R and 14L through a rear differential 26 and right and left rear axle shafts 27R and 27L respectively. In the four wheel drive modes of operation, drive is also transmitted to front wheels 13R and 13L from transfer case 21 through a front drive shaft 28, front differential 29 and right and left front axle shafts 31R and 31L respectively. While rear drive shaft 24 may be coaxial with the transmission output shaft 23, the front drive shaft 28 which extends from transfer case 21 to front differential 29 is offset to one side of the rotary axis of the transmission and planetary gear set. The front differential 29 is therefore displaced to one side of the center of the vehicle and the right front axle shaft 31R is longer than the left front axle shaft 31L. Front and rear differentials 26 and 29 may be of conventional construction, preferably of the limited slip variety, and are therefore shown only schematically in the drawing.

Planetary gear set 22 has a sun gear 32 disposed coaxially with respect to the transmission output shaft 23 but being rotatable relative thereto and has a rotatable planet carrier 33 which is also coaxial with the transmission output shaft. Carrier 33 supports planet gears 34 which engage sun gear 32 and which are rotatable about their own axes as well as being orbitable around the sun gear as the planet carrier itself turns. Planet gears 34 also engage a ring gear 36 which is coupled to rear drive shaft 24 for rotation therewith, through an annular hub 37, the ring gear and hub also being rotatable about the axis of the transmission output shaft 23. To selectively couple the rear drive shaft 24 to the transmission output shaft 23 for synchronous rotation, a lock-up clutch 38 is disposed between the planet carrier 33 and the rear drive shaft in coaxial relationship therewith. Transmission output shaft 23 is coupled to planet carrier 33 by a member 39 and therefore upon engagement of clutch 38 the rear drive shaft may be caused to rotate in synchronism with the transmission output shaft 23.

To transmit power to transfer case 21 for delivery to the front axle system in the four wheel drive modes of operation, a hollow shaft 41 is disposed coaxially with respect to the central portion of the transmission output shaft 23 and couples sun gear 32 with an intermediate gear 42 within the transfer case. Gear 42 engages a transfer gear 43 which in turn engages a toothed hub 44 situated in the transfer case in coaxial relationship to front drive shaft 28. A four wheel drive clutch 46 is carried in hub 44 and may be engaged to transmit drive from the hub to the front drive shaft 28.

In order to selectively establish an overdrive condition in the system as will hereinafter be discussed in more detail, a brake 47 is disposed between hollow shaft 41 and a non-rotatable component 48 of the vehicle and may be selectively engaged to stop rotation of the shaft 41.

In operation, conditioning of the drive system to establish any particular one of the several possible operational modes is accomplished by selectively engaging and disengaging particular combinations of the clutches 38 and 46 and brake 47.

A first possible operational mode is two wheel drive which may be established by engaging only the lock-up clutch 38. Under that condition, rear drive shaft 24 is coupled to transmission output shaft 23 for synchronous rotation therewith and power is delivered to the two rear wheels 14. However, many vehicles equipped for four wheel drive, such as tractors, earthmoving equipment and the like, are worked at relatively low vehicle speeds and have transmissions chosen to provide speed ranges which are geared lower than those which might be utilized in a vehicle that normally operates at higher speeds. Further, in this kind of vehicle, four wheel drive is usually used at the lower speeds employed when the vehicle is working, the two wheel drive being used only for traveling at relatively high speed on good road surfaces. Thus in such vehicles it is advantageous if an overdrive is provided so that higher vehicle travel speeds may be realized when desired although the transmission was designed primarily for low speed working operation. This overdrive mode of operation, in two wheel drive, may be realized with the present invention in both forward and reverse by engaging only brake 47 while clutches 38 and 46 are kept disengaged. Under this condition, sun gear 32 of the planetary gear set is held stationary. Consequently, as planet carrier 33 turns in synchronism with the transmission output shaft 23, the planet gears 34 are forced to revolve about their own axes while orbiting around the stationary sun gear. Consequently, ring gear 36 is forced to turn in the same direction at a speed greater than that of the transmission output. As the ring gear 36 is coupled to rear drive shaft 24 by hub 37, the desired overdrive mode of operation is realized.

Considering now the four wheel drive modes of operation, the four wheel drive lock-up mode is established by engaging both clutches 38 and 46 while the brake 47 remains disengaged. With clutch 38 engaged, the rear drive shaft 24 turns in synchronism with the transmission output shaft 23 as previously described. Since both ring gear 36 and planet carrier 33 are now forced to turn at the same speed, sun gear 32 is similarly constrained to rotate in synchronism with the transmission output shaft 23. This sun gear rotation is transmitted to the front drive shaft 28 through shaft 41, gear 42, transfer gear 43, hub 44 and the engaged clutch 46 of the transfer case.

To establish the alternate or torque splitting mode of four wheel drive, wherein a predetermined division of torque between the front and rear drive shafts is realized, clutch 46 is engaged while clutch 38 and brake 47 remain disengaged. With clutch 46 engaged, drive is transmitted from transmission output shaft 23 to carrier 33 causing the planet gears 34 to orbit around the sun gear 32. As sun gear 32 is now effectively coupled in driving relationship to the front wheels 13 while ring gear 36 is drivingly coupled to the rear wheels 14, the planet gears revolve about their own axes and deliver a first proportion of the available torque to the sun gear and the remainder of the available torque to the ring gear with the ratio of the torque split being determined by the ratio of the diameter of the ring gear to that of the sun gear. This gear ratio is predetermined to establish a desired division of torque for the particular vehicle under anticipated operating conditions and in a typical example will provide 33% of the available torque to the front drive shaft 28 and the remaining 67% of the available torque to the rear drive shaft 24. In addition, it may be seen that there is a differential action at planetary gearing 22 between the front and rear axle systems. This avoids the forced tire slippage and increased drive system stresses which can occur in the four wheel drive lock-up mode of operation and in many prior four wheel drive systems if there is a slight difference in diameter of the front and rear wheels or as a result of other transient operating conditions.

In addition to providing for selection of two wheel drive, two wheel drive with overdrive, four wheel drive lock-up and four wheel drive with a torque splitting effect, the system also offers a convenient means for establishing other desirable conditions such as a parking lock wherein at least one set and preferably all of the wheels of the vehicle are stopped from any rotation. The rear wheels 14 may be locked against rotation by simultaneously engaging clutch 38 and brake 47. This immobilizes the sun gear 32 while locking the planet carrier 33 to the ring gear 36 for synchronous rotation therewith. Rotation of the rear drive axle 24 is therefore made impossible since in order for such rotation to occur, the ring gear 36 would necessarily have to revolve faster than the planet carrier 33 and that is prevented by the engagement of clutch 38. Preferably the front axle 28 is also immobilized in the parking mode by engagement of clutch 46, the front drive shaft 28 being thereby coupled to the sun gear 32 which is being held against rotation by the engagement of brake 47 as described above.

A variety of control mechanisms may be utilized to effect the engagement and disengagement of clutches 38 and 46 and brake 47 for the purposes described above. For example, individual manually operated mechanical or fluid controls may be provided for each clutch and brake. However, in many specific vehicles certain ones of the operational modes of the drive system are preferably used with certain predetermined speed ranges of the vehicle and where this situation exists controls for the clutches 38 and 46 and brake 47 may advantageously be made responsive to manipulations of the operator's gear shift lever 19. For example, in some forms of earthworking vehicles, the four wheel drive modes of operation may normally be used at lower vehicle speeds while the two wheel drive mode is used only at the highest vehicle speed range. The control mechanism 49 of this particular example is suitable for a vehicle of this type.

As previously pointed out, the transmission 16 of this example provides three forward speeds and one reverse speed and the gear shift lever 19 further has forward overdrive and reverse overdrive and park positions. The control mechanism 49 is arranged to automatically condition the drive system 11 to the four wheel drive modes of operation at the first, second and third forward speed settings of shift lever 19 and at the reverse setting thereof while at the forward and reverse overdrive positions of the gear shift lever, at which the transmission 16 itself remains conditioned to the third forward speed or reverse, respectively, the system is automatically conditioned for the two wheel drive mode of operation. At any of the shift lever positions at which the system 11 is automatically conditioned for four wheel drive, the control mechanism 49 further provides for operator selection of either the torque splitting mode or the lock-up mode.

The clutches 38 and 46 and brake 47 are each operated by an associated one of three fluid pressure controlled actuators 51, 52 and 53 respectively. Each of the actuators is of the form which is spring biased to hold the associated one of the clutches or brake in the engaged condition unless a fluid pressure signal is received at a port 54 in which case a piston 56 within the actuator is retracted against the spring force to disengage the associated one of the clutches or brake. Thus, in the absence of fluid pressure at any of the ports 54, all clutches and the brake are engaged and the system is held in the parking mode.

The port 54 of each of the actuators 51, 52 and 53 is communicated with an associated individual one of three two position control valves 57, 58 and 59 respectively. Each control valve 57, 58 and 59 has an unpiloted position at which fluid pressure from a suitable source is transmitted to the port 54 of the associated one of the three actuators 51, 52, and 53 respectively thereby causing the associated one of the clutches and brakes 38, 46 and 47 to be in the disengaged condition. Upon being piloted to the alternate position, each such control valve 57, 58 and 59 vents the port 54 of the associated actuator 51, 52 or 53 thereby causing engagement of the associated one of the clutches and brake 38, 46, and 47. Accordingly, any of the above described modes of operation of the drive system 11 may be realized by piloting appropriate ones or combinations of the control valves 57, 58 and 59.

Piloting of the control valves for this purpose may be effected, for example, by a series of cams 61 responsive to the position of the transmission shift mechanism selector rod 18. Thus a first cam 62 is positioned to be depressed by a protuberance 63 on selector rod 18 at both the forward and reverse overdrive positions. Such depression of cam 62 pilots control valve 58 to vent actuator 52 and thereby engage brake 47 to establish two wheel drive overdrive as previously described. Another cam 64 is positioned to be depressed by protuberance 63 at any of the reverse and first, second and third forward speeds of the transmission. This depression of cam 64 pilots control valve 59 to depressurize actuator 53 and thereby engage the four wheel drive clutch 46. Still another cam 66 is positioned to be depressed at the park setting of the transmission shift mechanism selector rod 18. Depression of cam 66 pilots all three control valves 57, 58 and 59 thereby venting all three actuators 51, 52 and 53 to engage both clutches 38 and 46 and brake 47. This establishes the park condition of the drive system as previously described.

If the system is conditioned to four wheel drive solely by depression of cam 64 as described above, only clutch 46 is engaged and thus the torque splitting mode of operation is realized. This may be converted to the four wheel drive lock-up mode at the operator's discretion by manually piloting control valve 57 to exhaust actuator 51 thereby engaging lock-up clutch 38. A lock up mode selector lever 68 may be linked to control valve 57 for this purpose.

It may be observed that the overdrive mode of operation wherein brake 47 is engaged is incompatible with the four wheel drive lock-up mode of operation wherein both clutches 38 and 46 are engaged as the result would be to lock both the front and rear drive axles 24 and 28 against rotation as occurs in the parking mode. To avoid undesired locking of the system from an inadvertent positioning of the operator's shift lever 19 at one of the overdrive positions while lever 68 is at the lock-up position, a two position blocker valve 69 may be disposed in the flow path between control valve 57 and actuator 51. Blocker valve 69 has an unpiloted position at which the flow path from control valve 57 to actuator 51 is open and has a piloted position at which such flow path is blocked and actuator 51 is pressurized thereby preventing engagement of clutch 38. Blocker valve 69 is spring biased to the unpiloted position but is shifted to the piloted position upon depression of the previously described cam 62 at the forward and reverse overdrive positions of the shift lever 19. Thus, upon depression of cam 62 by positioning of the transmission shift lever 19 in one of the overdrive positions, valve 69 is piloted to apply pressure to actuator 51. This holds clutch 38 in a disengaged condition regardless of the position of the actuator valve 57 which normally controls clutch 38.

While the invention has been described with respect to a particular embodiment thereof, it will be apparent that many variations are possible and it is not intended to limit the invention except as defined by the following claims.

What is claimed is:

1. A drive transmitting system for a vehicle which has an engine and first and second sets of drive wheels spaced apart longitudinally along said vehicle, said first and second sets of drive wheels being driven through first and second drive shafts respectively, comprising a planetary gear set having a drive input member and first and second drive output members, means coupling said drive input member to said engine, means coupling said first output member to said first drive shaft, four wheel drive clutch means for selectively coupling said second output member to said second drive shaft, an overdrive brake means selectively engageable to immobilize said second output member whereby said first drive shaft may be selectively caused to rotate at a greater rate than said input member and, lock-up clutch means for selectively coupling said drive input member to said first drive shaft whereby differential action by said planetary gear set may be selectively eliminated and said first and second drive shafts are constrained to rotate at a predetermined rate relative to said input member and relative to each other.

2. The combination defined in claim 1 further comprising parking means for maintaining both said lock up clutch means and said overdrive brake means in engaged condition when said vehicle is to be parked whereby said first drive shaft is immobilized.

3. The combination defined in claim 2 wherein said parking means engages said four-wheel drive clutch means together with said lock-up clutch means and said brake means whereby both of said drive shafts are immobilized.

4. The combination defined in claim 1 wherein said vehicle has a transmission shift control element which is shifted to a first position to establish a relatively low speed range of said vehicle and which is shifted to a second position to establish a higher speed range of said vehicle, further comprising means for engaging said four wheel drive clutch means when said shift control element is at said first position and means for disengaging said four wheel drive clutch means while engaging said overdrive brake means when said shift control element is at said second position.

5. The combination defined in claim 1 wherein said drive input member of said planetary gear set is a planet carrier having at least one planet gear mounted thereon and wherein said first and second output members are a ring gear and a sun gear respectively each being engaged with said planet gear, said sun gear and said planet carrier and said ring gear and rotating elements of said overdrive brake means and said lock-up clutch means all being disposed for rotation about a single axis.

6. The combination defined in claim 5 further comprising manually operable control means for selectively engaging and disengaging said lock up clutch means when said four wheel drive clutch means is engaged.

7. A drive system for a vehicle which has an engine and a transmission output shaft and which has a pair of rear wheels driven by a rear drive shaft and a pair of front wheels driven by a front drive shaft comprising:
 a planetary gear set having a planet carrier coupled to said transmission output shaft for rotation therewith and carrying at least one planet gear and which has a ring gear engaging said planet gear and coupled to said rear drive shaft for synchronous rotation therewith and which further has a sun gear disposed in coaxial relation to said transmission output shaft and which engages said planet gear,
 a transfer case having an intermediate gear coupled to said sun gear for synchronous rotation therewith and having a transfer gear engaged with said first gear and having a clutch driving gear engaged with said transfer gear,
 a four wheel drive clutch for selectively coupling said front drive shaft to said clutch driving gear for rotation therewith,
 a lock up clutch for selectively clutching said rear drive shaft to said planet carrier for rotation therewith,
 and an overdrive brake for selectively immobilizing said sun gear.

8. A vehicle drive system as defined in claim 7 further comprising control means for selectively engaging and disengaging said lock up clutch while said four wheel drive clutch is engaged.

9. A vehicle drive system as defined in claim 7 further comprising control means for engaging said four wheel drive clutch when said transmission is in a low speed range thereof, and additional control means for disengaging said four wheel drive clutch and engaging said brake when said transmission is in a high speed range thereof.

10. A vehicle drive system as defined in claim 9 further comprising park means for simultaneously engaging at least said lock up clutch and said brake to immobilize said vehicle.

* * * * *